US012528520B2

(12) United States Patent
Crossley et al.

(10) Patent No.: US 12,528,520 B2
(45) Date of Patent: Jan. 20, 2026

(54) VEHICLE COMMUNICATION CONTROL SYSTEM

(71) Applicant: Transportation IP Holdings, LLC, Norwalk, CT (US)

(72) Inventors: Scott Crossley, Waterford, PA (US); Patricia Sue Lacy, Lawrence Park, PA (US); Ajith Kuttannair Kumar, Ashburn, VA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 172 days.

(21) Appl. No.: 18/472,080

(22) Filed: Sep. 21, 2023

(65) Prior Publication Data

US 2024/0140495 A1  May 2, 2024

Related U.S. Application Data

(60) Provisional application No. 63/419,609, filed on Oct. 26, 2022.

(51) Int. Cl.
| | |
|---|---|
| *B61C 17/12* | (2006.01) |
| *B60L 7/10* | (2006.01) |
| *B60L 7/18* | (2006.01) |
| *B60L 15/20* | (2006.01) |
| *B60L 15/32* | (2006.01) |
| *B60T 7/12* | (2006.01) |
| *B60T 8/17* | (2006.01) |

(52) U.S. Cl.
CPC ............... *B61C 17/12* (2013.01); *B60L 7/18* (2013.01); *B60L 15/2009* (2013.01); *B60L 15/32* (2013.01); *B60T 7/12* (2013.01); *B60T 8/1705* (2013.01); *B60L 2200/26* (2013.01); *B60T 2270/604* (2013.01)

(58) Field of Classification Search
CPC . B61C 17/12; B60L 15/32; B60L 7/18; B60L 15/2009; B60L 2200/26; B60L 2260/16; B60L 7/10; B60L 7/12; B60L 7/14; B60L 7/16; B60T 7/12; B60T 8/1705; B60T 2270/604

See application file for complete search history.

(56) References Cited

U.S. PATENT DOCUMENTS

2013/0184905 A1\*  7/2013  Hatanaka ............. B60W 10/08
                                                 701/19

\* cited by examiner

*Primary Examiner* — Jacob M Amick
(74) *Attorney, Agent, or Firm* — K&L Gates LLP (57) ABSTRACT

A method is provided that may include receiving consist commands from a vehicle system controller at a consist controller onboard at least one consist of a multi-vehicle system. The consist commands may direct one or more of a power call or a braking call by the at least one consist. The method may include determining individual vehicle commands for each of an electric vehicle and a fuel-based vehicle in the at least one consist. The individual vehicle commands may be determined to achieve the power or braking call from the at least one consist. The individual vehicle command for the electric vehicle may differ from the individual vehicle command for the fuel-based vehicle. The method may include controlling motoring or braking of the electric vehicle and the fuel-based vehicle by communicating the individual vehicle commands to the electric vehicle and the fuel-based vehicle.

20 Claims, 6 Drawing Sheets

VEHICLE COMMUNICATION CONTROL SYSTEM

CROSS-REFERENCE TO RELATED APPLICATIONS

This application claims priority to U.S. Provisional Application No. 63/419,609, filed on Oct. 26, 2022, the entire disclosure of which is incorporated herein by reference.

BACKGROUND

Technical Field

The present disclosure relates generally to methods and systems of communication for a vehicle system.

Discussion of Art

Communication among vehicles of a vehicle system, such as locomotives and other cars in a train consist, is important to ensure the coordination of various functions of the vehicle system. Functions such as throttle control, braking and direction, for example, are important to coordinate among locomotives during a train consist's operation. Radio frequency schemes may be used for intra-vehicle communication within the consist with various combinations of transmitters, receivers and/or transceivers being distributed among the lead and remote locomotives. During a locomotive distributed power operation the lead or command locomotive may transmit instructions or control information in a command message to one or more remote or controlled locomotives that are located in the back of or behind the lead locomotive within a train consist.

Existing communication systems may suffice for vehicle systems where each vehicle can operate based on the same instruction. For example, all vehicles of the vehicle system will operate in a motoring mode or all vehicles of the vehicle system will operate in a braking mode. In a vehicle system having two or more directly coupled remote vehicles, the coupled vehicles may function in unison via control signals transmitted over connected multiple unit (MU) lines. However, in the event of vehicle systems with vehicles that may use or require different instructions, for example where the vehicle system includes fuel-powered vehicles and electric or battery powered vehicles, the communication system may have limitations. The potentially large number of communications transmitted between vehicles may congest the available bandwidth used to transmit the signals.

With existing vehicle systems, in order to achieve a desired outcome, such as fuel efficiency, it may require the ability to control each vehicle in the vehicle system individually. Controlling each vehicle in the vehicle system individually may require a communication network within each grouping of vehicles within the vehicle system. In some examples, this may require the entire vehicle system to be equipped with additional hardware and/or software. To modify every vehicle in the vehicle system may be expensive due to equipment, labor, scheduling maintenance, among other factors.

It may be desirable to have a system and method that differs from those that are currently available.

BRIEF DESCRIPTION

In accordance with one example or aspect, a method is provided that may include receiving consist commands from a vehicle system controller at a consist controller onboard at least one consist of a multi-vehicle system. The consist commands may direct one or more of a power call for propulsive power to be generated by the at least one consist or a braking call for braking effort to be generated by the at least one consist. The method may include determining individual vehicle commands for each of an electric vehicle and a fuel-based vehicle in the at least one consist to allocate the consist commands among the electric vehicle and the fuel-based vehicle. The individual vehicle commands may be determined to achieve the one or more of the power call or the braking call of the consist commands from the at least one consist. The individual vehicle commands for the electric vehicle may differ from the individual vehicle commands for the fuel-based vehicle. The method may include controlling motoring or braking of the electric vehicle and of the fuel-based vehicle by communicating the individual vehicle commands to the electric vehicle and the fuel-based vehicle.

In accordance with one example or aspect, a vehicle control system is provided that may include a consist controller that may be onboard at least one consist of a multi-vehicle system. The consist controller may receive consist commands from a vehicle system controller. The consist commands may direct one or more of a power call for propulsive power to be generated by the at least one consist or a braking call for braking effort to be generated by the at least one consist. The consist controller may determine individual vehicle commands for an electric vehicle and a fuel-based vehicle to allocate the consist commands among the electric vehicle and the fuel-based vehicle. The consist controller may determine the individual vehicle commands to achieve the one or more of the power call or the braking call of the consist commands. The individual vehicle commands for the electric vehicle may differ from the individual vehicle commands for the fuel-based vehicle. The consist controller may control motoring or braking of the electric vehicle and of the fuel-based vehicle by communicating the individual vehicle commands to the electric vehicle and the fuel-based vehicle.

In accordance with one example or aspect, a vehicle control system is provided that may include a vehicle system controller that may determine consist commands for a first consist of a multi-vehicle system. The consist commands may direct one or more of a power call for propulsive power to be generated by the first consist or a braking call for braking effort to be generated by the first consist. The vehicle system controller may repeatedly send the consist commands to the first consist and may determine an electric vehicle command for an electric vehicle in the first consist. The electric vehicle command may direct the electric vehicle to brake or to generate propulsive effort. The vehicle system controller may determine and send the electric vehicle command less frequently than the consist commands for the first consist.

BRIEF DESCRIPTION OF THE DRAWINGS

The subject matter may be understood from reading the following description of non-limiting embodiments, with reference to the attached drawings, wherein below.

DETAILED DESCRIPTION

Embodiments of the subject matter described herein relate to a vehicle control system and method for control motoring and braking in a vehicle system formed from plural vehicles. With existing vehicles systems including more than one vehicle, a communication network between the vehicles may require each vehicle to be equipped with hardware and/or software to facilitate communication. To modify every vehicle in the vehicle system may be expensive due to equipment, labor, scheduling and performing maintenance, and the like.

It may be advantageous to have a system that allows limited communication capability using existing communication channels. The system may send repeated, periodic, and/or low-rate information to the vehicles of the vehicle system. This may allow the vehicles of the vehicle system to communicate without having each vehicle equipped with additional hardware or software.

Embodiments of the subject matter described herein relate to communicating with vehicles of a vehicle system and controlling movement of the vehicle system.

Communication among vehicles of the vehicle system, such as locomotives and other cars in a train consist, may be important to ensure the coordination of various functions of the vehicle system. Functions such as throttle control, braking and direction, for example, may be important to coordinate among locomotives during a train consist's operation. Radio frequency schemes may be used for intra-vehicle communication within the consist with various combinations of transmitters, receivers and/or transceivers being distributed among the lead and remote locomotives. During a locomotive distributed power operation the lead or command locomotive may transmit instructions or control information in a command message to one or more remote or controlled locomotives that may located in the back of or behind the lead locomotive within a train consist.

Existing communication systems may suffice for vehicle systems where each vehicle can operate based on the same instruction. For example, all vehicles of the vehicle system will operate in a motoring mode or all vehicles of the vehicle system will operate in a braking mode. In a vehicle system having two or more directly coupled remote vehicles, the coupled vehicles may function in unison via control signals transmitted over their connected multiple unit or MU lines. However, in the event of vehicle systems with vehicles that may use different instructions, for example where the vehicle system may include fuel-powered vehicles and electric powered vehicles, the communication system may have limitations. For example, the potentially large number of communications transmitted between vehicles may congest the available bandwidth used to transmit the signals.

With existing vehicle systems, in order to achieve a desired outcome, such as fuel efficiency, it may require the ability to control each vehicle in the vehicle system individually. Controlling each vehicle in the vehicle system individually may require a communication network within each grouping of vehicles within the vehicle system. In some examples, this may require the entire vehicle system to be equipped with additional hardware and/or software. To modify every vehicle in the vehicle system may be expensive due to equipment, labor, and scheduling maintenance, among other factors.

The present subject matter may address the above issues using one or more of multiple strategies. In one example, a communication network may be utilized that may require limited communication capability, may use existing communication channels, and may send repeated, periodic, and/or low-rate information to specific groupings of vehicles. This may allow the system to improve the performance and functionality of the vehicles in the vehicle system, for example, to increase performance, fuel efficiency, or the like.

While one or more embodiments are described in connection with a rail vehicle or a rail vehicle system, not all embodiments are limited to rail vehicle systems. Unless expressly disclaimed or stated otherwise, the subject matter described herein extends to other types of vehicles and/or vehicle systems, such as automobiles, trucks (with or without trailers), buses, marine vessels, aircraft, unmanned aircraft (e.g., drones), mining vehicles, agricultural vehicles, or other off-highway vehicles. The vehicle systems described herein (rail vehicle systems or other vehicle systems that do not travel on rails or tracks) may be formed from a single vehicle or multiple vehicles. With respect to multi-vehicle systems, the vehicles may be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy or consist).

A vehicle consist may be a group of two or more vehicles that may be mechanically coupled or otherwise linked via communication to travel together along a route. Trains may have one or more vehicle consists. Vehicles in consist may include a lead vehicle and one or more trail vehicles. The vehicles may include fuel-based vehicles and electric vehicles powered by one or more energy storage devices. Examples of vehicles that may be used in consist may include locomotives, passenger vehicles, marine vessels, aircrafts, mining equipment, or the like. The vehicles of a passenger train, for example, may be fitted with electrical power for lighting, and optional electric or pneumatic door systems, passenger information systems (public address or signage), alarm systems, and other specialized functions. A train may have at least one lead consist, and may also have one or more remote consists positioned further back in the train.

In a locomotive consist, each locomotive may include a connection at each end of each locomotive to couple the power and brake systems of one locomotive to one or more adjacent locomotives such that they may function together as a single unit. Each locomotive may be connected to subsequent locomotives via a cable. Likewise, passenger vehicles in a passenger vehicle consist may be connected via a cable. The cable that connects these consists may be referred to in the industry as a multiple unit cable or MU cable. The MU cable may be a port and jumper cable that may include about twenty-seven pins on each end. The MU cable may include an electrical power transmission line, such that electrical power may be distributed from a locomotive, control cab, or other passenger vehicle in consist to the other vehicles in consist. The MU cable may provide electrical power to run electronics or other systems onboard the vehicles, such as the lighting, automatic door systems, passenger information systems, alarm systems, and/or the like.

Two or more of the vehicles in consist may each include an onboard controller or other electronics. In some cases, it may be desirable to link the onboard electronics together as a computer network, such that electronics of the lead vehicle (e.g., locomotive, control cab, or passenger vehicle) in consist can communicate with electronics of the other vehicles in consist.

Communications in a vehicle consist historically may have been accomplished using various methods. A first method involves wireless communications between the vehicles in consist using radio equipment. Wireless communications, however, are costly to implement, and are particularly prone to cross talk between connected vehicles and vehicles not physically connected on adjacent tracks. A second method involves running dedicated network cables between the linked vehicles in consist. However, in most cases this may require retrofitting existing vehicles with additional cables, which may be cost prohibitive. Installation of additional connectors and wiring may be expensive, increase downtime, and lower reliability of consists in the train. Additionally, since the cabling may be exposed in the separation space between adjacent linked vehicles, the cabling may be prone to failure if the vehicle consist is operated in harsh environmental conditions, e.g., bad weather. There is also additional labor required to connect vehicles with dedicated network cables, and this will require additional training. Finally, installing additional functions or upgrading functions such as positive train control (PTC) or passenger information systems may require additional connectivity which may necessitate that even more cabling may be run between the vehicles in consist, especially for older trains that are not equipped with high level function connectivity.

Figure 1:
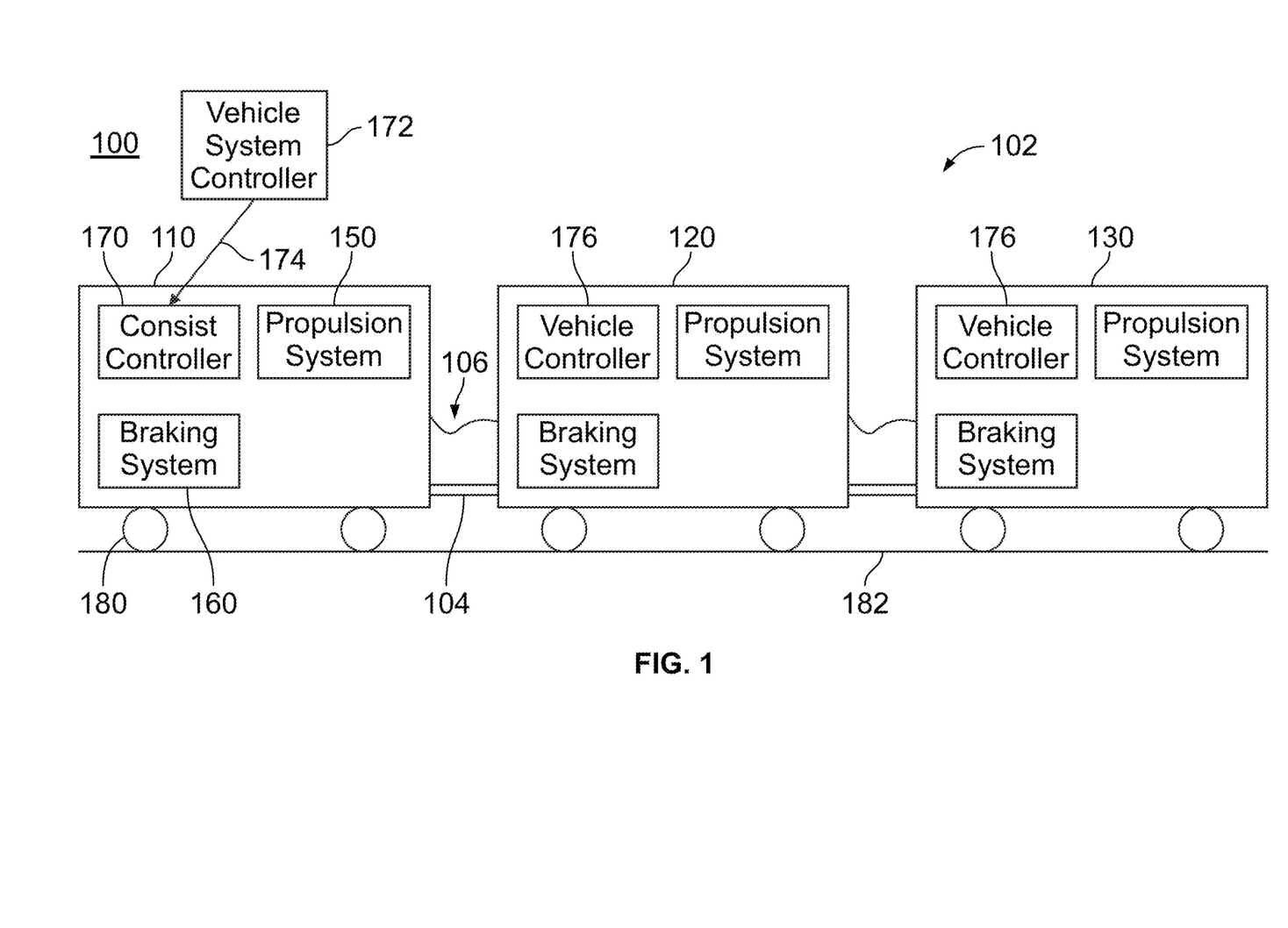
FIG. 1 shows one example of a vehicle control system capable of controlling motoring and braking in a vehicle system formed from plural vehicles.

FIG. 1 illustrates one example of a vehicle control system capable of controlling motoring and braking in a vehicle system formed from plural vehicles. The vehicle control system may include a communication system 100 that may be capable of communicating data in a vehicle consist 102. The consist may comprise a group of vehicles or vehicle system 110, 120, 130 that may be mechanically coupled or linked together along a route. In one example, the vehicles may be coupled through a coupler 104. The vehicles of the vehicle system may be logically coupled but not mechanically coupled when each vehicle may communicate with each other to coordinate movements of the vehicles with each other so that the vehicles travel together as a group. In the vehicle control system, data or information may be transmitted from one vehicle in the consist (e.g., a lead vehicle) to another vehicle in the consist (e.g., a trail vehicle). The communication system may communicate with remote locations that are off-board the vehicle. The communication system may include or represent an antenna (along with associated transceiver hardware circuitry and/or software applications) for wirelessly communicating with other vehicles in the consist and/or remote locations. Each vehicle may be adjacent to and mechanically coupled with another vehicle in the consist such that all vehicles in the consist are connected. In one embodiment, the data may be transmitted over a conductive pathway that extends between the vehicles, such as a vehicle MU cable bus 106. In another example, the conductive pathway may include another cable or bus, such as an electronically controlled pneumatic brake (ECP) train line. The MU cable bus may be an existing electrical bus interconnecting the lead vehicle and the trail vehicles in the consist.

As illustrated in FIG. 1, the vehicles may include a propulsion system 150 as well as a braking system 160. The propulsion system may operate to move the vehicle system along the route. The propulsion system can represent one or more engines, traction motors, transmissions, propellers, or the like, that may generate propulsion to move the vehicles. The brake system may operate to slow or stop movement of the vehicles. The brake system can include air brakes, friction brakes, motors (e.g., used for dynamic or regenerative braking), or the like. Certain vehicles (e.g., locomotives) and other off-highway vehicles may be powered by electric traction motors coupled in driving relationship to one or more axles of the vehicle.

In a motoring mode of operation, the traction motors may be supplied with electric current from a controllable source of electric power such as an engine-driven traction alternator. The traction motors may apply torque to vehicle wheels 180 which in turn may exert tangential force (tractive effort) on a surface 182 on which the vehicle is traveling, e.g., the parallel steel rails of a railroad track, and thereby propel the vehicle in a desired direction along a route of travel. In another instance, in a dynamic braking mode of operation, the motors may serve as axle-driven electrical generators when the vehicle may be slowing down. Dynamic braking may use kinetic energy of the vehicle's turning wheels to create electrical energy, which may cause the vehicle to decelerate. The dynamic braking mode may reduce wear on braking components and generate energy that may be stored on an energy storage device of the vehicle. In this mode of operation, the traction motors may exert torque in an opposite direction from the rolling direction of the wheels, thereby slowing the vehicle's motion.

The communication system illustrated in FIG. 1 may include a consist controller 170 onboard a vehicle in the consist. As shown in FIG. 1, the consist controller may be on a lead vehicle of the consist and may communicate with vehicle controllers 176 on different vehicles of the consist. In another embodiment, the consist controller may be on more than one vehicle of the consist. In other examples, the consist controller may be on another vehicle in the consist, such as a trailing vehicle or an intermediate vehicle. The consist controller may be offboard the vehicle system. The consist controller may receive a consist command 174 from a vehicle system controller or vehicle controller 172. In one example, the vehicle system controller may be offboard the vehicle system. In another example, the vehicle system controller may be onboard a vehicle of the vehicle system.

As discussed herein, the controllers (e.g., the vehicle system controller, the consist controller, etc.) may include microcontrollers, processors, microprocessors, or other logic devices that operate based on instructions stored on a tangible and non-transitory computer readable storage medium, such as software applications stored on a memory.

If a system, apparatus, assembly, device, etc. (e.g., a controller, control device, control unit, etc.) includes multiple processors, these processors may be located in the same housing or enclosure (e.g., in the same device) or may be distributed among or between two or more housings or enclosures (e.g., in different devices). The multiple processors in the same or different devices may each perform the same functions described herein, or the multiple processors in the same or different devices may share performance of the functions described herein. For example, different processors may perform different sets or groups of the functions described herein.

The vehicle system controller may provide a command regarding the required motoring or braking effort for the entire vehicle system. Said another way, the vehicle system controller may provide what motoring or braking effort may be required of all vehicles in a consist or of all consists of the vehicle system. The consist command may include a direction about the operation of the vehicle system, for example a throttle command instructing how much throttle or motoring power may be needed by the vehicle system or a braking command instructing how much braking effort may be needed by the system.

The consist controller may then determine how to allocate the command and communicate the command (e.g., throttle/motoring or braking) among the vehicles or the consists. The consist controller may command each consist of a consist output needed, and the consist may command each vehicle within the consist of a vehicle output required. In one example, the consist controller may direct different vehicles to operate at different capacities to achieve the overall command objective. The consist controller may be able to differentiate between various vehicle types, for example fuel-based vehicles and electric vehicles of the consist, as discussed below.

Figure 2:
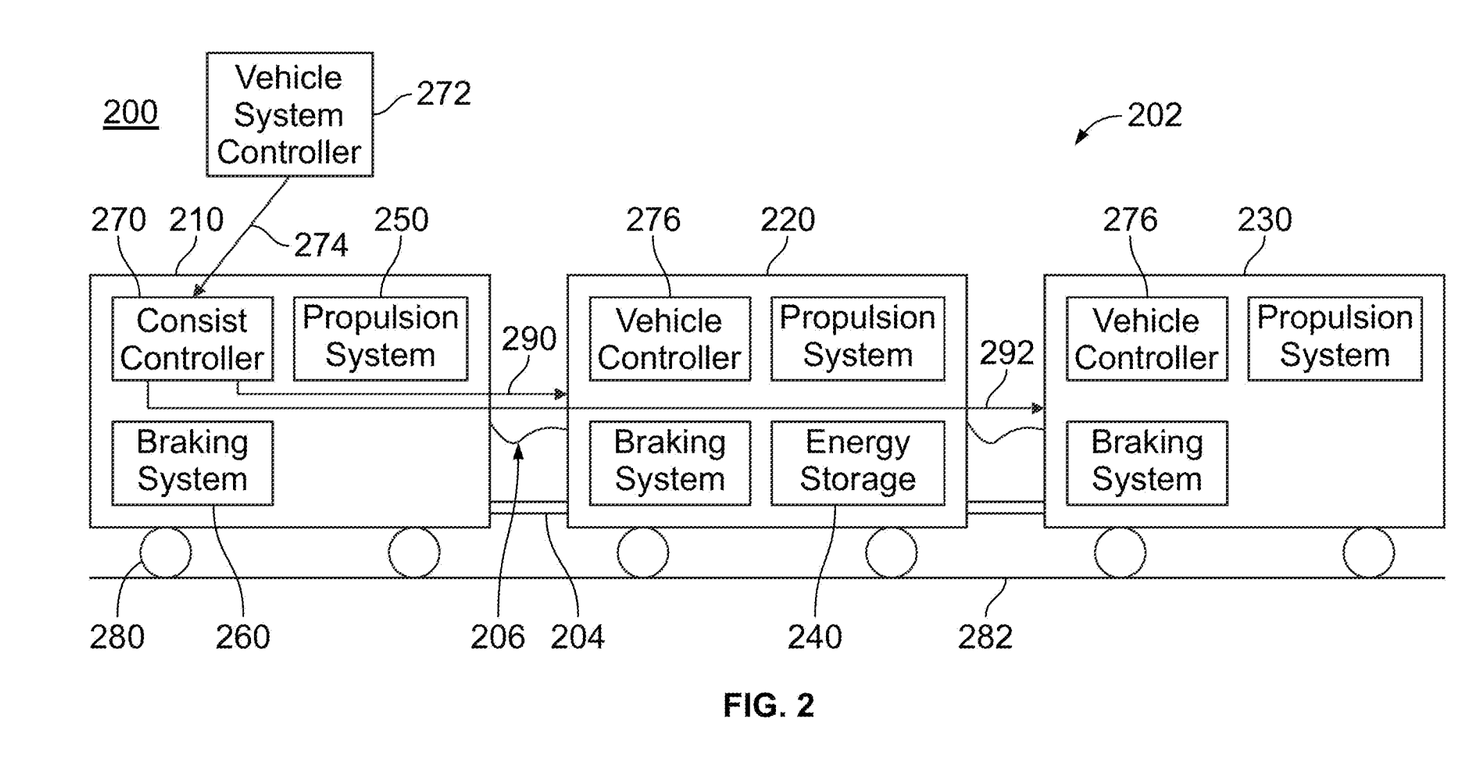
FIG. 2 shows one example of a vehicle control system capable of controlling motoring and braking in a vehicle system formed from plural vehicles.

FIG. 2 illustrates one example of a vehicle control system capable of controlling motoring and braking in a vehicle system formed from plural vehicles. The vehicle control system may include a communication system 200 that may communicate data in a vehicle consist 202. The consist may comprise a group of vehicles 210, 220, 230 that may be mechanically coupled or linked together along a route. In one example, the vehicles may be coupled through a coupler 204. The group of vehicles may be logically coupled but not mechanically coupled. The vehicles may include a propulsion system 250, a braking system 260, and wheels 280 positioned to engage a route 282 to be travelled by the vehicle system. In one embodiment, data may be transmitted over a conductive pathway that extends between the vehicles, such as a vehicle MU cable bus 206. The consist may include an electric vehicle, for example 220, powered by an energy storage device 240 onboard the electric vehicle. The consist may also include a fuel-based vehicle, for example 210 in FIG. 2, that is at least partially powered by consuming fuel.

The communication system illustrated in FIG. 2 may include a consist controller 270 onboard a vehicle in the consist. The consist controller may receive a consist command 274 from a vehicle system controller 272. The consist controller may communicate commands to vehicle controllers 276 onboard the vehicles of the vehicle system. The consist controller may be able to differentiate between various vehicle types, for example fuel-based vehicles and electric vehicles of the consist, illustrated in FIG. 2. The consist controller may determine individual vehicle commands for the electric vehicle and the fuel-based vehicle. The individual vehicle commands for the electric vehicle may differ from the individual commands for the fuel-based vehicle. This may allow the consist command to be allocated among the vehicles or consists to benefit the performance and efficiency of the vehicle system. As illustrated in FIG. 2, the consist controller may send an electric vehicle command 290 to electric vehicles in the vehicle system. The consist controller may send a fuel-based vehicle command 292 to the fuel-based vehicles in the vehicle system. Where the vehicles are within the same consist, the consist controller may send commands via intra-consist communication channels.

With regard to the fuel, the fuel may be a single fuel type in one embodiment and in other embodiments the fuel may be a mixture of a plurality of different fuels. In one example of a fuel mixture, a first fuel may be liquid and a second fuel may be gaseous. A suitable liquid fuel may be diesel (regular, biodiesel, HDRD, and the like), gasoline, kerosene, dimethyl ether (DME), alcohol, and the like. A suitable gaseous fuel may be natural gas (methane) or a short chain hydrocarbon, hydrogen, ammonia, and the like. In one embodiment, fuel may be inclusive of stored energy as used herein. In that perspective, a battery state of charge, or a source of compressed gas, a flywheel, fuel cell, and other types of non-traditional fuel sources may be included.

With regard to the communication systems, the communication systems may include one or more communication devices that may communicate with one or more of the vehicles and/or other remote locations that are off-board the vehicle system. The communication devices may include or represent an antenna (along with associated transceiver hardware circuitry and/or software applications) for wirelessly communicating with other vehicle systems and/or remote locations. Optionally, the communication device may communicate via one or more wired connections, such as an MU cable, a trainline, an electrically controlled pneumatic ECP brake line, or the like.

The consist command may be received at the consist controller more frequently than the individual vehicle command for the electric vehicle may be communicated to the electric vehicle. In one example, the consist commands may be received by the consist controller wirelessly and the individual vehicle commands may be communicated by one or more conductive pathways or optical pathways. The vehicle command communicated to the electric vehicle may be communicated repeatedly, periodically, and/or with low-rate configuration information. Said another way, the electric vehicle may get a command (e.g., a motoring command or a braking command) and may execute the given command until the electric vehicle receives another command. For example, the electric vehicle may be given a motoring command and the electric vehicle may operate in the motoring mode until a stop motoring or a braking command may be communicated. This may increase the efficiency of the existing communication channels and bandwidth of the communication system by not overwhelming the communication system with non-essential communication to the electric vehicle.

Figure 3:
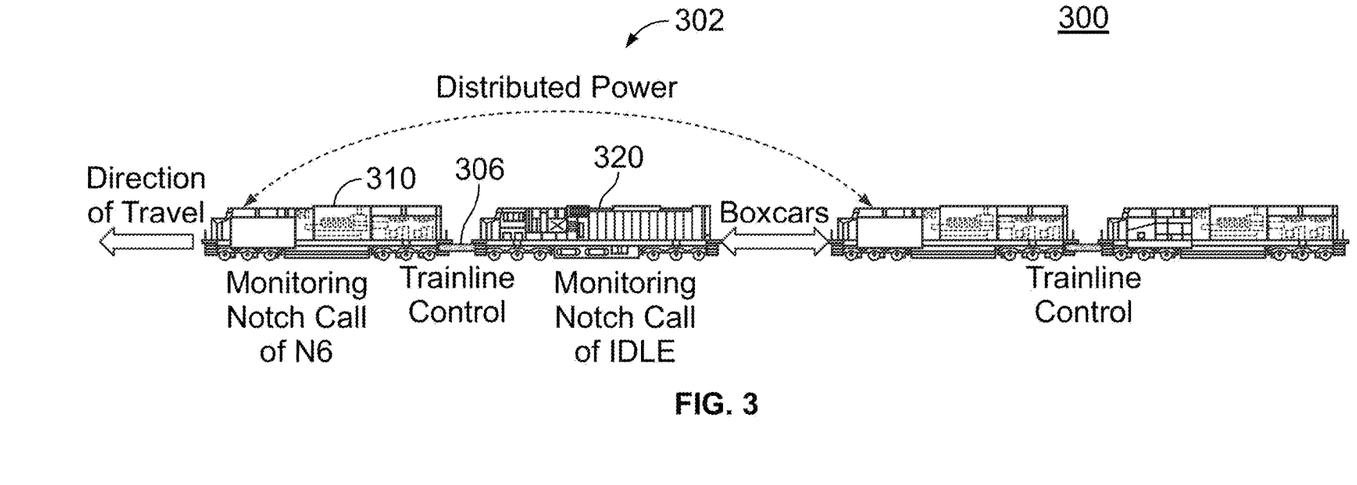
FIG. 3 shows one example of a vehicle control system capable of controlling motoring in a vehicle system formed from plural vehicles.

FIG. 3 illustrates one example of a vehicle control system 300 that may control motoring of a vehicle system 302 formed from plural vehicles. In the example illustrated in FIG. 3, a power call may be split between the vehicles or consists of the vehicle system, such as being split between the fuel-based vehicle 310 and the electric vehicle 320 to provide a commanded propulsive power for the vehicle system. The fuel-based vehicle and the electric vehicle may be a part of the same consist. However, the fuel-based vehicle and the electric vehicle may be in different consists.

The consist controller may communicate the power call between the vehicles in the consist via a trainline 306, MU cable bus, or the like. The power call may be split evenly between the fuel-based vehicle and the electric vehicle. In another example, the power call may be split unevenly between the fuel-based vehicle and the electric vehicle. The fuel-based vehicle and the electric vehicle may be commanded to execute the power call at different notches.

In one example, the fuel-based vehicle may be commanded to contribute more propulsive power than the electric vehicle in order to preserve the capacity of the energy storage device. In another example, the energy demand may command the electric vehicle to provide propulsive power, for example where the vehicle system may be travelling up a steep grade and electric vehicle power may be needed to maintain operation and reduce stalling of the vehicle system. The consist command may include a power call for propulsive power to be generated by one consist of the vehicle system, as shown in FIG. 3. The power call may be sent to only one vehicle of the consist of the vehicle system. For example, the entirety of the power call may be sent to the fuel-based vehicle to provide all, or a majority, of the commanded propulsive power for the vehicle system.

The entirety of the power call may be sent to two or more fuel-based vehicles of the vehicle system to provide all of the commanded propulsive power. This may allow the electric vehicle to conserve energy for an anticipated energy demand on the trip. The power call may direct the electric vehicle to remain or switch to an idle throttle while the fuel-based vehicle generates the commanded propulsive effort. In another example, the entirety of the power call may be sent to the electric vehicle to provide all, or a majority, of the commanded propulsive power for the vehicle system. In one example, the entirety of the power call may be sent to two or more electric vehicles of the vehicle system to provide all, or a majority, of the commanded propulsive power. This may be done where the fuel-based vehicle may be low on fuel, where the energy storage device of the electric vehicle may be sufficiently charged, and/or where an upcoming portion of the route may require substantial energy demand such as a steep grade. Additionally, this may be done where the energy storage device of the electric vehicle may be charged and an upcoming portion of the trip may have an anticipated energy creation portion for the electric vehicle (e.g., a prolonged downhill portion that may allow the electric vehicle to recharge the energy storage device). The consist controller may determine the how to split the power call between the vehicles (e.g., all to fuel-based, all to electric, split between fuel-based and electric) based on the energy or fuel level of the vehicles, projected energy requirements, current energy output needed, performance requirements, or the like.

Figure 4:
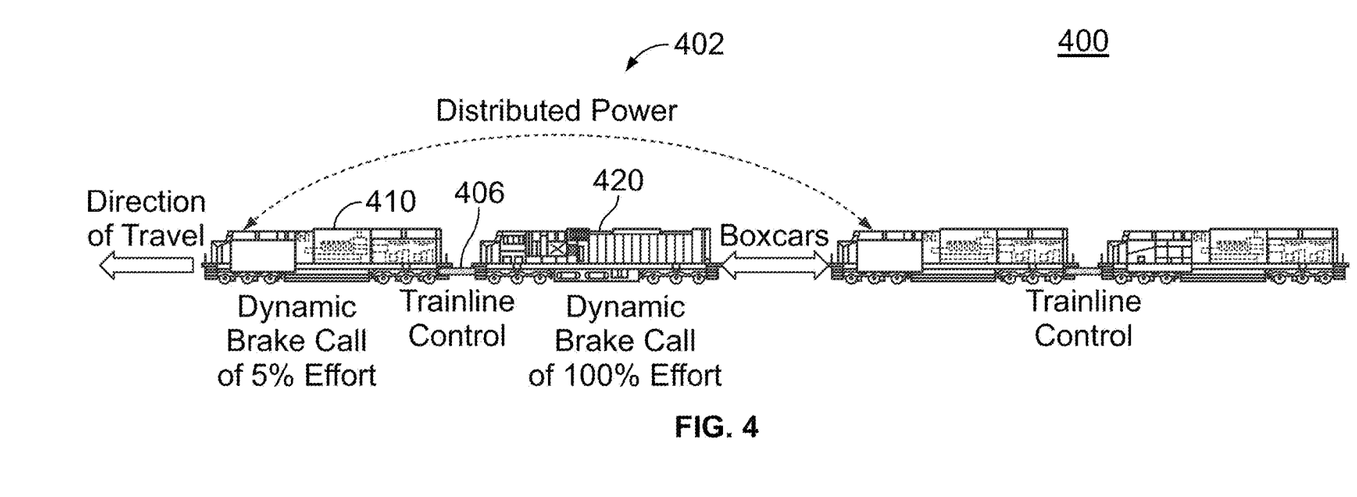
FIG. 4 shows one example of a vehicle control system capable of controlling braking in a vehicle system formed from plural vehicles.

FIG. 4 illustrates one example of a vehicle control system 400 that may control braking of a vehicle system 402 formed from plural vehicles. In the example illustrated in FIG. 4, the braking call may be split between the vehicles or consists of the vehicle system, such as being split between the fuel-based vehicle 410 and the electric vehicle 420 to provide the braking effort for the vehicle system. The braking call may command the fuel-powered vehicle to provide a 5% braking effort while the electric vehicle may be commanded to provide 100% braking effort. In other examples, the commanded braking effort of the fuel-powered vehicle may be between 0-100% and the commanded braking effort of the electric vehicle may be between 0-100%. The consist controller may communicate the power call between the vehicles in the consist via a trainline 406, MU cable bus, or the like.

The braking call may be split between the fuel-based vehicle and the electric vehicle in order to facilitate efficient recharging of the energy storage device onboard the electric vehicle. For example, the commanded braking call may direct the electric vehicle to command more of the commanded braking effort than the fuel-based vehicle for recharging the fuel-based vehicle for recharging the energy storage devices onboard the electric vehicle. The braking call may be split evenly between the fuel-based vehicle and the electric vehicle. In another example, the braking call may be split unevenly between the fuel-based vehicle and the electric vehicle. In one example, the consist command may include a braking call for braking effort to be generated by one of the vehicles and/or consists. The braking call may direct at least one of the vehicles or consists to generate a commanded braking effort via dynamic braking. The braking call may be sent to only one vehicle or consist of the vehicle system. For example, the entirety of the braking call may be sent to the fuel-based vehicle to provide all, or a majority, of the commanded braking effort for the vehicle system. In another example, the entirety of the braking call may be sent to the electric vehicle to provide all, or a majority, of the braking effort for the vehicle system. The consist controller may determine the braking call distribution based on the different types of vehicles (e.g., all to fuel-based, all to electric, split between fuel-based and electric), based on the energy or fuel level of the vehicles, projected energy requirements, current energy output needed, performance requirements, or the like.

Figure 5:
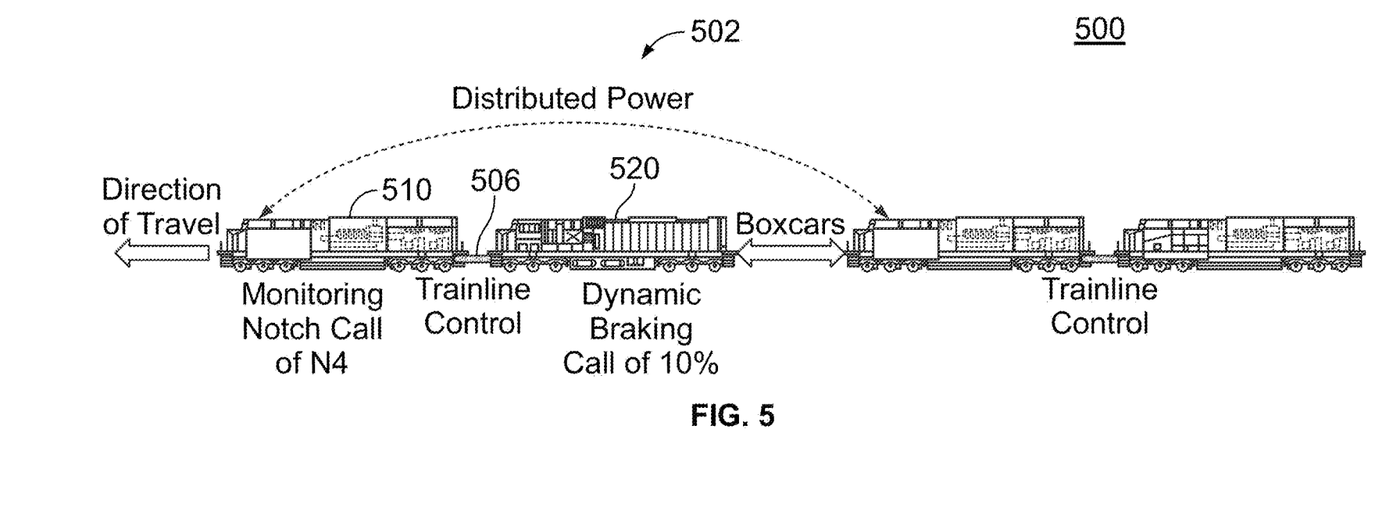
FIG. 5 shows one example of a vehicle control system capable of controlling motoring and braking in a vehicle system formed from plural vehicles.

FIG. 5 illustrates one example of a vehicle control system 500 that may control motoring and braking of a vehicle system 502 formed from plural vehicles. The consist command may include a motoring call for propulsive power to be generated by one of the vehicles and/or consists, as well as a braking call for braking effort to be generated by a different one of the vehicles and/or consists. In the example illustrated in FIG. 5, the fuel-based vehicle may be commanded to provide propulsive power, while the electric vehicle may be commanded to a braking call, such as a dynamic braking call. The consist controller may communicate the power call between the vehicles in the consist via a trainline 506, MU cable bus, or the like. These commands together may allow for charging of the energy storage device on the electric vehicle by the fuel-based vehicle, as a result of the dynamic braking combined with the propulsive power. While this operation may burn fuel, this operating mode may be used to gain energy required to avoid stalls or to provide energy reserves at the end of a trip. In this mode, the electric vehicle may be in the lead position or in any trailing position.

The examples illustrated in FIGS. 3-5 may show the power calls and the braking calls being divided between vehicles within the same consist. However, in other examples, the power calls and the braking calls may be divided between vehicles in different consists of the vehicle system.

Figure 6:
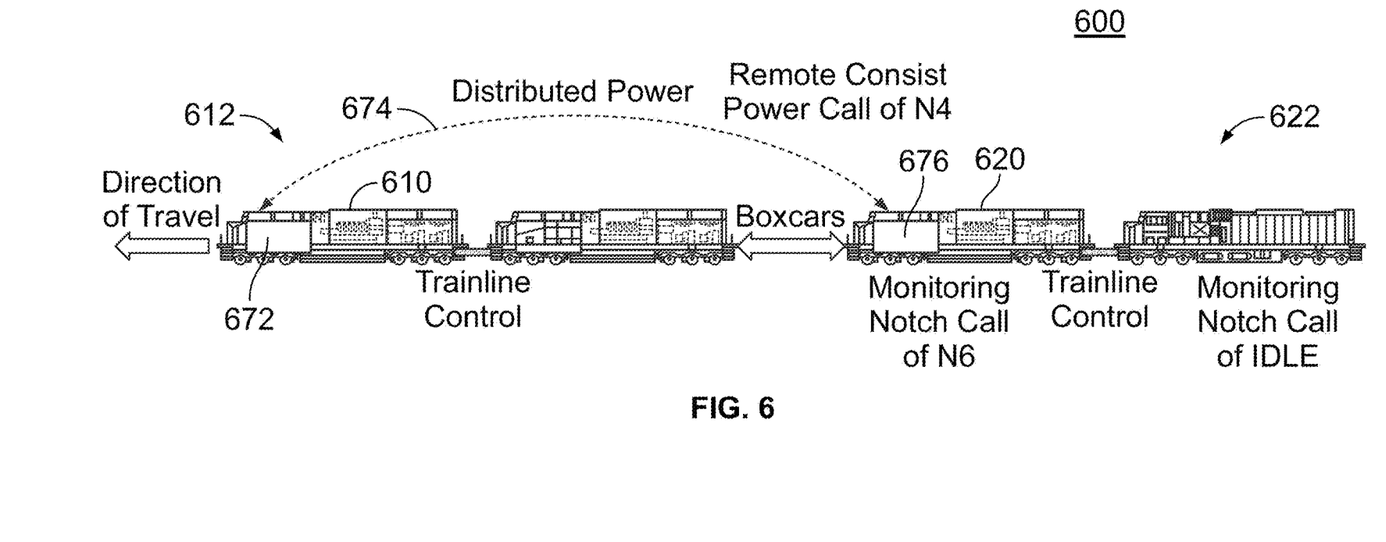
FIG. 6 shows one example of a vehicle control system capable of controlling motoring in a vehicle system with at least two consists.

FIG. 6 illustrates one example of a communication system 600 between consists. A system controller 672 may communicate a consist command 674 to a vehicle controller 676 of the vehicle system. In one example, the system controller may be onboard a first lead vehicle 610 in a first consist 612. The system controller may communicate with the vehicle controller onboard a second lead vehicle 620 on a second consist 622. The system controller may communicate with vehicle controller on the second consist using a distributed power (DP) communication system. The DP communications system may include a communications channel (e.g., a radio frequency (RF) communications channel or a wire-based communications channel) linking the first consist and the second consist.

The vehicle controller may generate motoring and braking commands responsive to input from the system controller. The vehicle controller may communicate the command to the first consist. The motoring or braking commands may then be transmitted from the first consist to the second consist over the communications channel. The receiving second consist may respond to motoring or braking commands to apply motoring effort or to apply or release the brakes. The second consist may advise the first consist that the command was received and executed.

Figure 7:
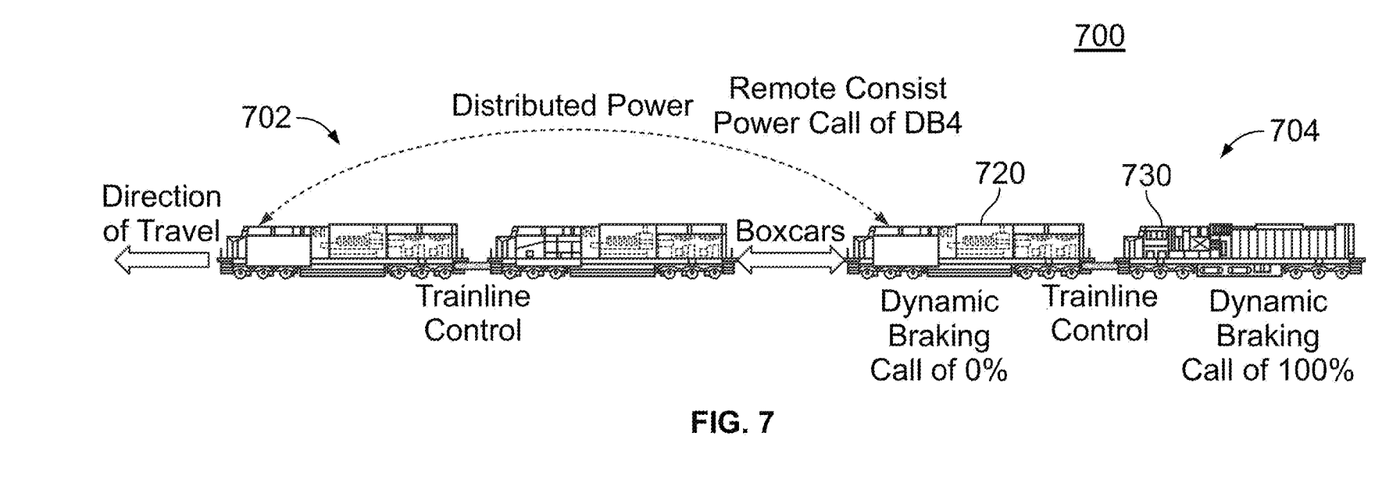
FIG. 7 shows one example of a vehicle control system capable of controlling braking in a vehicle system with at least two consists.

FIG. 7 illustrates one example of a vehicle control system 700 that may control braking of a vehicle system with at least two consists. The braking call may be communicated between a first consist 702 and a second consist 704. The second consist may split the braking call between one or more vehicles 720, 730. The braking call may be allocated based on the factors discussed above with references to FIG. 4. For example, the braking call may command the fuel-powered vehicle to provide a 5% braking effort while the electric vehicle may be commanded to provide 100% braking effort. In other examples, the commanded braking effort of the fuel-powered vehicle may be between 0-100% and the commanded braking effort of the electric vehicle may be between 0-100%.

Figure 8:
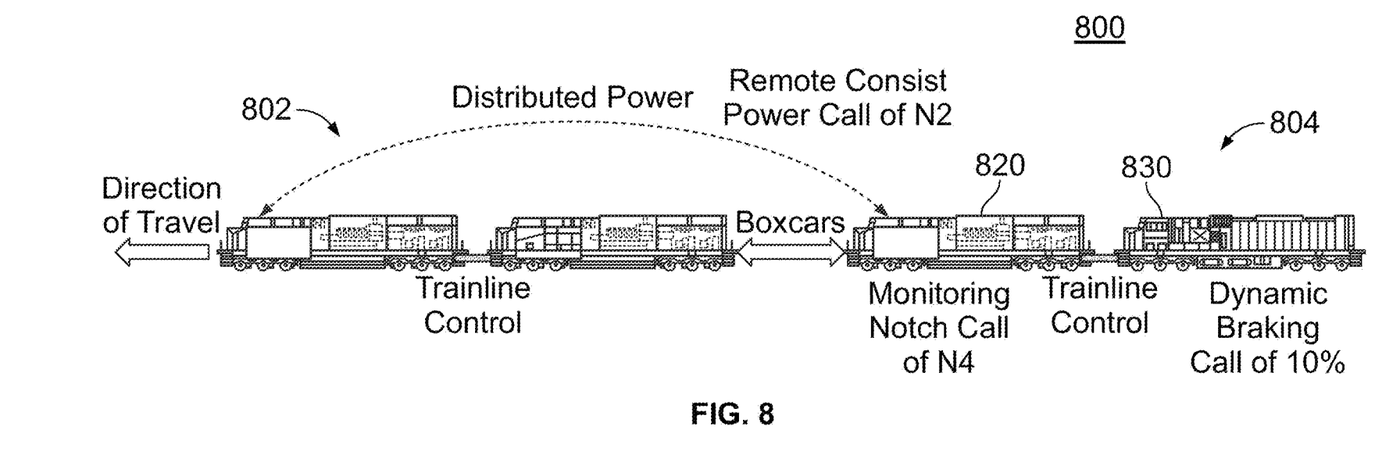
FIG. 8 shows one example of a vehicle control system capable of controlling motoring and braking in a vehicle system with at least two consists.

FIG. 8 illustrates one example of a vehicle control system 800 that may control motoring and braking of a vehicle system with at least two consists. The command may be sent from a first consist 802 to a second consist 804. The consist command may include a motoring call for propulsive power to be generated by one of the vehicles and/or consists, as well as a braking call for braking effort to be generated by a different one of the vehicles and/or consists. In the example illustrated in FIG. 8, the fuel-based vehicle may be commanded to provide propulsive power, while the electric vehicle may be commanded to a braking call, such as a dynamic braking call.

Figure 9:
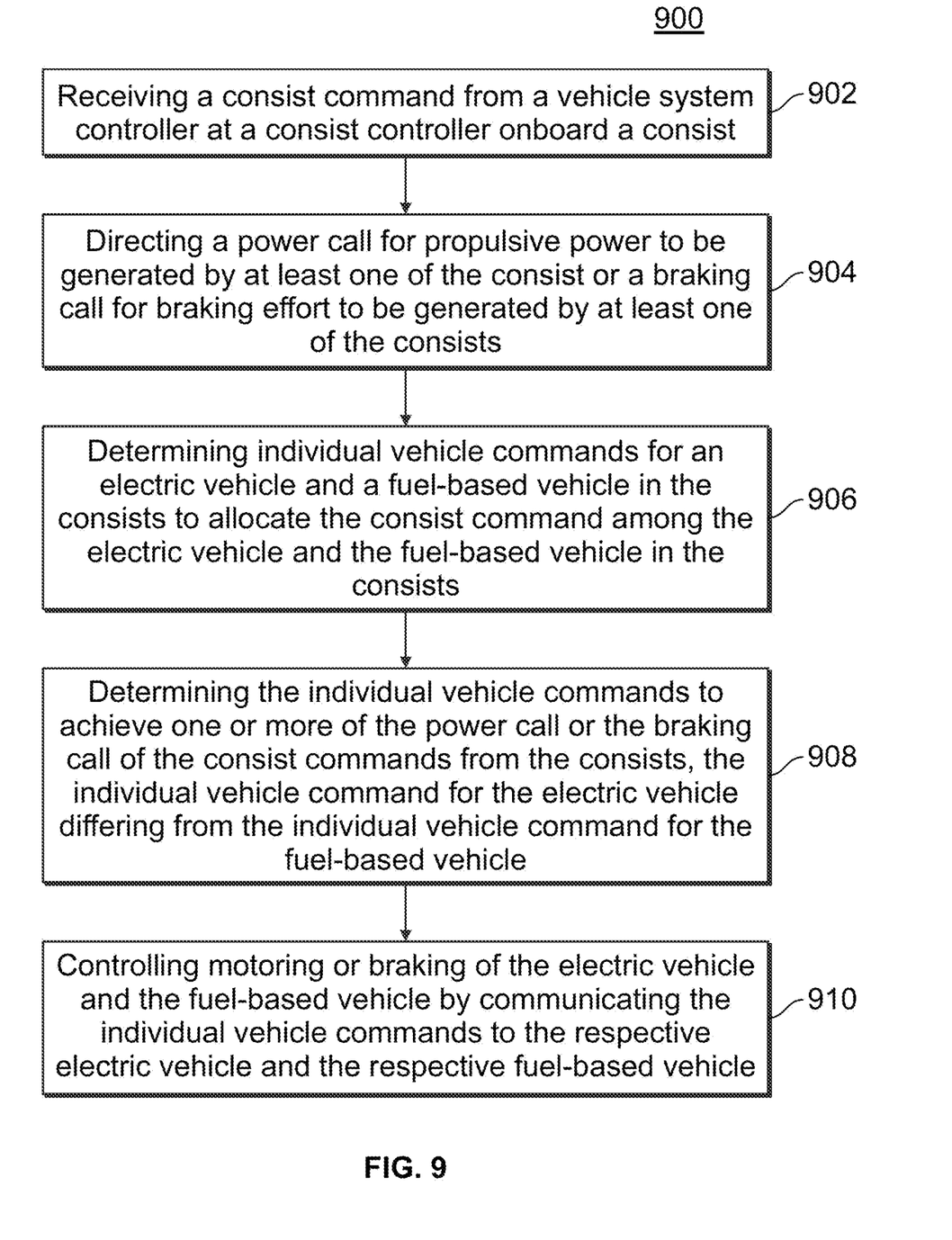
FIG. 9 shows a flow chart of one example of a method of controlling motoring and braking in a vehicle system formed from plural vehicles.

FIG. 9 illustrates a method 900 of controlling motoring and braking of a vehicle system formed from plural vehicles arranged into one or more consists. At least one of the one or more consists may include an electric vehicle powered by one or more energy storage devices onboard the electric vehicle and a fuel-based vehicle that may be at least partially powered by consuming fuel. At step 902, the method may include receiving a consist command from a vehicle system controller at a consist controller onboard a consist. The consist command may provide the overall needed motoring or braking output for the entirety of the vehicle system. The consist controller may receive the consist command and may direct individual vehicles in the vehicle system to achieve the needed output.

At step 904, the method may include the consist command directing a power call for propulsive power to be generated by at least one of the consist or a braking call for braking effort to be generated by at least one of the consist. The propulsive power or braking effort may be generated by one consist. In another embodiment, the propulsive power or braking effort may be generated by two or more consists.

At step 906, the method may include determining individual vehicle commands for the electric vehicle and the fuel-based vehicle in the consists to allocate the consist command among the electric vehicle and the fuel-based vehicle in the consists. The individual vehicle commands may be allocated to increase performance and efficiency of the vehicle system. The consist controller may use vehicle operational characteristics, external weather factors, trip planning or the like to determine individual vehicle commands.

At step 908, the method may include the individual vehicle commands being determined to achieve one or more of the power call or the braking call of the consist commands from the consists. The individual vehicle command for the electric vehicle may differ from the individual vehicle command for the fuel-based vehicle. The individual vehicle commands may increase performance and longevity of the vehicle system by increasing the functional capacity of the energy storage device on the electric vehicle.

At step 910, the method may include controlling motoring or braking of the electric vehicle and the fuel-based vehicle by communicating the individual vehicle commands to the respective electric vehicle and the respective fuel-based vehicle.

In one embodiment, a method is provided that may include receiving consist commands from a vehicle system controller at a consist controller onboard at least one consist of a multi-vehicle system. The consist commands may direct one or more of a power call for propulsive power to be generated by the at least one consist or a braking call for braking effort to be generated by the at least one consist. The method may include determining individual vehicle commands for each of an electric vehicle and a fuel-based vehicle in the at least one consist to allocate the consist commands among at least the electric vehicle and the fuel-based vehicle. The individual vehicle commands may be determined to achieve the one or more of the power call or the braking call of the consist commands from the at least one consist. The individual vehicle commands for the electric vehicle may differ from the individual vehicle commands for the fuel-based vehicle. The method may include controlling motoring or braking of the electric vehicle and of the fuel-based vehicle by communicating the individual vehicle commands to the electric vehicle and the fuel-based vehicle.

In one example, at least one of the consist commands may include the braking call directing the at least one consist to generate a commanded braking effort via dynamic braking. The individual vehicle commands may be determined based on the braking call directing the electric vehicle to generate more of the commanded braking effort via the dynamic braking than the fuel-based vehicle for recharging of one or more energy storage devices onboard the electric vehicle. At least one of the consist commands may include the power call directing the at least one consist to generate a commanded propulsive effort. The individual vehicle commands may be determined based on the power call and directing the electric vehicle to generate less of the commanded propulsive effort than the fuel-based vehicle. At least one of the consist commands may include the power call directing the at least one consist to generate a commanded propulsive effort. The individual vehicle commands may be determined based on the power call and directing the electric vehicle to remain in or switch to an idle throttle while the fuel-based vehicle generates the commanded propulsive effort.

The method may include at least one of the consist commands including the power call directing the at least one consist to generate a commanded propulsive effort. The individual vehicle commands may be determined based on the power call and directing the electric vehicle to dynamically brake while the fuel-based vehicle generates the commanded propulsive effort. The individual vehicle commands for the fuel-based vehicle may direct the fuel-based vehicle to generate more propulsive effort than the commanded propulsive effort.

In one example, the electric vehicle may be a lead vehicle in the at least one consist and the fuel-based vehicle may be a trail vehicle in the at least one consist. In another example, the electric vehicle may be a trail vehicle in the at least one consist and the fuel-based vehicle may be a lead vehicle in the at least one consist. The at least one consist may be a lead consist. The at least one consist may be a trail consist.

The consist commands may be wirelessly received and the individual vehicle commands may be communicated via one or more conductive pathways or optical pathways. The consist commands may be received at the consist controller more frequently than the individual vehicle commands for the electric vehicle may be communicated to the electric vehicle.

In one embodiment, a vehicle control system is provided that may include a consist controller that may be onboard at least one consist of a multi-vehicle system. The consist controller may receive consist commands from a vehicle system controller. The consist commands may direct one or more of a power call for propulsive power to be generated by the at least one consist or a braking call for braking effort to be generated by the at least one consist. The consist controller may determine individual vehicle commands for an electric vehicle and a fuel-based vehicle to allocate the consist commands among the electric vehicle and the fuel-based vehicle. The consist controller may determine the individual vehicle commands to achieve the one or more of the power call or the braking call of the consist commands. The individual vehicle commands for the electric vehicle may differ from the individual vehicle commands for the fuel-based vehicle. The consist controller may control motoring or braking of the electric vehicle and the fuel-based vehicle by communicating the individual vehicle commands to the electric vehicle and the fuel-based vehicle.

In one example, the consist controller may receive at least one of the consist commands that may include the braking call directing the at least one consist to generate a commanded braking effort via dynamic braking. The consist controller may determine the individual vehicle commands based on the braking call and directing the electric vehicle to generate more of the commanded braking effort via the dynamic braking than the fuel-based vehicle for recharging of one or more energy storage devices onboard the electric vehicle. The consist controller may receive at least one of the consist commands that may include the power call directing the at least one consist to generate a commanded propulsive effort. The consist controller may determine the individual vehicle commands based on the power call and directing the electric vehicle to generate less of the commanded propulsive effort than the fuel-based vehicle. The consist controller may receive at least one of the consist commands that may include the power call directing the at least one of the consists to generate a commanded propulsive effort. The consist controller may determine the individual vehicle commands based on the power call and directing the electric vehicle to remain in or switch to an idle throttle while the fuel-based vehicle generates the commanded propulsive effort.

The consist controller may receive at least one of the consist commands that may include the power call directing the at least one consist to generate a commanded propulsive effort. The consist controller may determine the individual vehicle commands based on the power call directing the electric vehicle to dynamically brake while the fuel-based vehicle generates the commanded propulsive effort.

In one embodiment, a vehicle control system is provided that may a vehicle system controller that may determine consist commands for a first consist of a multi-vehicle system. The consist commands may direct one or more of a power call for propulsive power to be generated by the first consist or a braking call for braking effort to be generated by the first consist. The vehicle system controller may repeatedly send the consist commands to the first consist and may determine an electric vehicle command for an electric vehicle in the first consist. The electric vehicle command may direct the electric vehicle to brake or to generate propulsive effort. The vehicle system controller may determine and send the electric vehicle command less frequently than the consist commands for the first consist.

In one example, the vehicle system controller may determine a power command of the consist commands that may direct the first consist to generate a designated propulsive effort. The vehicle system controller also may determine the electric vehicle command to direct the electric vehicle to dynamically brake while a fuel-based vehicle generates at least part of the designated propulsive effort. The vehicle system controller may determine a power command of the consist commands that may direct the first consist to generate a designated propulsive effort. The vehicle system controller also may determine the electric vehicle command to direct the electric vehicle to not generate propulsive effort or to generate less propulsive effort than a fuel-based vehicle while the first consist generates the designated propulsive effort.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the subject matter without departing from its scope. While the dimensions and types of materials described herein define the parameters of the subject matter, they are exemplary embodiments. Other embodiments will be apparent to one of ordinary skill in the art upon reviewing the above description. The scope of the subject matter should, therefore, be determined with reference to the appended claims, along with the full scope of equivalents to which such claims are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

A reference herein to a patent document or any other matter identified as prior art, is not to be taken as an admission that the document or other matter was known or that the information it contains was part of the common general knowledge as at the priority date of any of the claims.

What is claimed is:

1. A method, comprising:
   receiving consist commands from a vehicle system controller at a consist controller onboard at least one consist of a multi-vehicle system, the consist commands directing one or more of a power call for propulsive power to be generated by the at least one consist or a braking call for braking effort to be generated by the at least one consist;
   determining individual vehicle commands for each of an electric vehicle and a fuel-based vehicle in the at least one consist to allocate the consist commands among the electric vehicle and the fuel-based vehicle, the individual vehicle commands determined to achieve the one or more of the power call or the braking call of the consist commands from the at least one consist, the individual vehicle commands for the electric vehicle differing from the individual vehicle commands for the fuel-based vehicle, wherein the individual vehicle commands are determined based on an energy level of the electric vehicle and a fuel level of the fuel-based vehicle; and
   controlling motoring or braking of the electric vehicle and the fuel-based vehicle by communicating the individual vehicle commands to the electric vehicle and the fuel-based vehicle.

2. The method of claim 1, wherein at least one of the consist commands includes the braking call directing the at least one consist to generate a commanded braking effort via dynamic braking, the individual vehicle commands determined based on the braking call directing the electric vehicle to generate more of the commanded braking effort via the dynamic braking than the fuel-based vehicle for recharging of one or more energy storage devices onboard the electric vehicle.

3. The method of claim 1, wherein at least one of the consist commands includes the power call directing the at least one consist to generate a commanded propulsive effort, the individual vehicle commands determined based on the power call and directing the electric vehicle to generate less of the commanded propulsive effort than the fuel-based vehicle.

4. The method of claim 1, wherein at least one of the consist commands includes the power call directing the at least one consist to generate a commanded propulsive effort, the individual vehicle commands that are determined based on the power call directing the electric vehicle to remain in or switch to an idle throttle while the fuel-based vehicle generates the commanded propulsive effort.

5. The method of claim 1, wherein at least one of the consist commands includes the power call directing the at least one of the one or more consists to generate a commanded propulsive effort, the individual vehicle commands that are determined based on the power call directing the electric vehicle to dynamically brake while the fuel-based vehicle generates the commanded propulsive effort.

6. The method of claim 5, wherein the individual vehicle commands for the fuel-based vehicle directs the fuel-based vehicle to generate more propulsive effort than the commanded propulsive effort.

7. The method of claim 1, wherein the consist commands are wirelessly received, and the individual vehicle commands are communicated via one or more conductive pathways or optical pathways.

8. The method of claim 1, wherein the consist commands are received at the consist controller more frequently than the individual vehicle commands for the electric vehicle are communicated to the electric vehicle.

9. A vehicle control system, comprising:
   a consist controller configured to be onboard at least one consist of a multi-vehicle system, the consist controller configured to receive consist commands from a vehicle system controller, the consist commands configured to direct one or more of a power call for propulsive power to be generated by the at least one consist or a braking call for braking effort to be generated by the at least one consist,
   the consist controller configured to determine individual vehicle commands for an electric vehicle and a fuel-based vehicle to allocate the consist commands among the electric vehicle and the fuel-based vehicle, the consist controller configured to determine the individual vehicle commands to achieve the one or more of the power call or the braking call of the consist commands, the individual vehicle commands for the electric vehicle differing from the individual vehicle commands for the fuel-based vehicle, wherein the individual vehicle commands are determined based on an energy level of the electric vehicle and a fuel level of the fuel-based vehicle, and
   the consist controller configured to control motoring or braking of the electric vehicle and the fuel-based vehicle by communicating the individual vehicle commands to the electric vehicle and the fuel-based vehicle.

10. The vehicle control system of claim 9, wherein the consist controller is configured to receive at least one of the consist commands that includes the braking call directing the at least one consists to generate a commanded braking effort via dynamic braking, the consist controller configured to determine the individual vehicle commands based on the braking call directing the electric vehicle to generate more of the commanded braking effort via the dynamic braking than the fuel-based vehicle for recharging of one or more energy storage devices onboard the electric vehicle.

11. The vehicle control system of claim 9, wherein the consist controller is configured to receive at least one of the consist commands that includes the power call directing the at least one consist to generate a commanded propulsive effort, the consist controller configured to determine the individual vehicle commands based on the power call and directing the electric vehicle to generate less of the commanded propulsive effort than the fuel- based vehicle.

12. The vehicle control system of claim 9, wherein the consist controller is configured to receive at least one of the consist commands that includes the power call directing the at least one consist to generate a commanded propulsive effort, the consist controller configured to determine the individual vehicle commands based on the power call and directing the electric vehicle to remain in or switch to an idle throttle while the fuel-based vehicle generates the commanded propulsive effort.

13. The vehicle control system of claim 9, wherein the consist controller is configured to receive at least one of the consist commands that includes the power call directing the at least one consist to generate a commanded propulsive effort, the consist controller configured to determine the individual vehicle commands based on the power call and directing the electric vehicle to dynamically brake while the fuel-based vehicle generates the commanded propulsive effort.

14. A vehicle control system, comprising:
a vehicle system controller configured to determine consist commands for a first consist of a multi-vehicle system, the consist commands directs one or more of a power call for propulsive power to be generated by the first consist or a braking call for braking effort to be generated by the first consist, and
the vehicle system controller configured to repeatedly send the consist commands to the first consist and determine an electric vehicle command for an electric vehicle in the first consist, the electric vehicle command directs the electric vehicle to brake or to generate propulsive effort, the vehicle system controller configured to determine and send the electric vehicle command less frequently than the consist commands for the first consist, wherein the electric vehicle command is determined based on an energy level of the electric vehicle.

15. The vehicle control system of claim 14, wherein the vehicle system controller is configured to determine a power command of the consist commands that directs the first consist to generate a designated propulsive effort, the vehicle system controller also configured to determine the electric vehicle command to direct the electric vehicle to dynamically brake while a fuel-based vehicle generates at least part of the designated propulsive effort.

16. The vehicle control system of claim 14, wherein the vehicle system controller is configured to determine a power command of the consist commands that directs the first consist to generate a designated propulsive effort, the vehicle system controller also configured to determine the electric vehicle command to direct the electric vehicle to not generate propulsive effort or to generate less propulsive effort than a fuel-based vehicle while the first consist generates the designated propulsive effort.

17. The method of claim 1, wherein the individual vehicle commands are further determined based on projected energy requirements and current energy output needed.

18. The method of claim 1, wherein the individual vehicle commands are further determined based on a route of the multi-vehicle system.

19. The method of claim 1, wherein the individual vehicle commands are further determined based on vehicle operational characteristics, external weather factors, or trip planning.

20. The method of claim 1, wherein the consist commands include a motoring or braking output for the multi-vehicle system and the individual vehicle commands are to achieve the motoring or braking output for the multi-vehicle system.

* * * * *